US012806769B2

(12) United States Patent
Kim et al.

(10) Patent No.: US 12,806,769 B2
(45) Date of Patent: Nov. 24, 2026

(54) ARTIFICIAL INTELLIGENCE TRAINING METHOD FOR INDUSTRIAL ROBOT

(71) Applicant: VAZIL Company Co., ltd, Busan (KR)

(72) Inventors: Sungwon Kim, Daegu (KR); Minkyu Kim, Yangsan-si (KR); Bekhzod Gofurovich Mustafaev, Busan (KR); Anvarjon Tursunov, Busan (KR)

(73) Assignee: VAZIL COMPANY CO., LTD, South (KR)

( * ) Notice: Subject to any disclaimer, the term of this patent is extended or adjusted under 35 U.S.C. 154(b) by 294 days.

(21) Appl. No.: 18/701,909

(22) PCT Filed: Oct. 25, 2022

(86) PCT No.: PCT/KR2022/016324
§ 371 (c)(1),
(2) Date: Oct. 29, 2024

(87) PCT Pub. No.: WO2023/075351
PCT Pub. Date: May 4, 2023

(65) Prior Publication Data

US 2025/0058462 A1 Feb. 20, 2025

(30) Foreign Application Priority Data

Oct. 25, 2021 (KR) ........................ 10-2021-0142663
Oct. 25, 2021 (KR) ........................ 10-2021-0142664
Oct. 24, 2022 (KR) ........................ 10-2022-0137194

(51) Int. Cl.
*B25J 9/16* (2006.01)
*G05B 19/418* (2006.01)

(52) U.S. Cl.
CPC ............... *B25J 9/163* (2013.01); *B25J 9/161* (2013.01); *B25J 9/1661* (2013.01); *G05B 19/41885* (2013.01)

(58) Field of Classification Search
CPC ......... G06F 18/00; B25J 9/161; B25J 9/1661; B25J 9/163; B25J 9/1671; G06N 3/08;
(Continued)

(56) References Cited

U.S. PATENT DOCUMENTS 9,250,624 B2 * 2/2016 Zimmermann ...... G05B 19/423
11,554,482 B2 * 1/2023 Chen ...................... B25J 9/1671
(Continued)

FOREIGN PATENT DOCUMENTS

KR 10-2020-0014368 A 2/2020
KR 102114496 B1 6/2020
(Continued)

OTHER PUBLICATIONS

Balayn et al., Adaptive handling assistance for industrial lightweight robots in simulation, 2016, IEEE, p. 1-8 (Year: 2016).*
(Continued)

*Primary Examiner* — Mcdieunel Marc
(74) *Attorney, Agent, or Firm* — Straylight LLP

(57) ABSTRACT

A method for training a task performance model of an industrial robot includes constructing a simulation environment based on a task target object of an industrial robot, generating additional training data of a task performance model of the industrial robot in the simulation environment, additionally training the task performance model based on the additional training data, and updating the task performance model.

13 Claims, 8 Drawing Sheets

(58) Field of Classification Search
CPC ........ G06N 3/00; G05B 23/02; G05B 19/048; G05B 19/41885; G05B 19/418; G10L 21/0232; G06V 20/40
See application file for complete search history.

(56) References Cited

U.S. PATENT DOCUMENTS

| | | | | |
|---|---|---|---|---|
| 12,585,255 | B2 * | 3/2026 | Cella | H04B 17/29 |
| 2011/0288667 | A1 * | 11/2011 | Noda | G05B 19/42 700/98 |
| 2019/0005374 | A1 | 1/2019 | Shankar et al. | |
| 2022/0024037 | A1 | 1/2022 | Lee et al. | |
| 2022/0234196 | A1 | 7/2022 | Tachikake | |
| 2023/0215146 | A1 | 7/2023 | Kim et al. | |
| 2024/0391104 | A1 * | 11/2024 | Brönmark | B25J 9/1676 |
| 2025/0153363 | A1 * | 5/2025 | Khansari Zadeh | B25J 9/161 |

FOREIGN PATENT DOCUMENTS

| | | | |
|---|---|---|---|
| KR | 10-2020-0080372 | A | 7/2020 |
| KR | 10-2021-0073001 | A | 6/2021 |
| KR | 102424305 | B1 | 7/2022 |
| WO | WO 2021084587 | A1 | 5/2021 |

OTHER PUBLICATIONS

Wan et al., DeepClaw: A Robotic Hardware Benchmarking Platform for Learning Object Manipulation, 2020, IEEE, p. 2011-2018 (Year: 2020).*

Fang et al., Multi-Task Domain Adaptation for Deep Learning of Instance Grasping from Simulation, 2018, IEEE, p. 3516-3523 (Year: 2018).*

Ye et al., Active Object Perceiver: Recognition-Guided Policy Learning for Object Searching on Mobile Robots, 2018, IEEE, p. 6857-6863 (Year: 2018).*

* cited by examiner

ARTIFICIAL INTELLIGENCE TRAINING METHOD FOR INDUSTRIAL ROBOT

TECHNICAL FIELD

The present disclosure relates to a training method of artificial intelligence for industrial robots, and particularly, to a method of constructing a simulation environment based on a task target object of an industrial robot, and training a task performance model of the industrial robot based on the simulation environment.

BACKGROUND ART

Currently, industrial robots are widely used in various fields of industry. Industrial robots are designed to perform a variety of tasks, such as moving objects, detecting abnormalities, and navigating rough roads, depending on the field in which the robot operates.

With the development of machine learning technologies such as deep learning, some industrial robots are mounted and operated with trained artificial neural network models. Operating the industrial robot based on the artificial neural network model has the advantage of high accuracy compared to operating the industrial robot based on a simple algorithm.

However, when operating the artificial neural network model, if data of a type not previously trained by the artificial neural network model is input, the model is likely to produce an incorrect output. In order to prevent this, it is necessary to identify the current state of the industrial robot and additionally retrain the model accordingly, but in the conventional artificial neural network model, there is a problem of the cost of preparing additional learning data, and a problem in that the operation of the model should be stopped for retraining.

Therefore, there is a need in the art for a method to properly train the artificial neural network model of the industrial robot without interrupting the operation of the industrial robot.

Korean Patent Registration No. 2424305 discloses a method, an apparatus, and a computer program for generating and providing data video for generating training data of artificial intelligence model.

DISCLOSURE

Technical Problem

The present disclosure is contrived in response to the above-described background, and has been made in an effort to construct a simulation environment based on a task target object of an industrial robot, and additionally train a task performance model of the industrial robot based on the simulation environment.

Meanwhile, a technical object to be achieved by the present disclosure is not limited to the above-mentioned technical object, and various technical objects can be included within the scope which is apparent to those skilled in the art from contents to be described below.

Technical Solution

According to an embodiment of the present disclosure for implementing the object, disclosed is a method for training a task performance model of an industrial robot. The method may include constructing a simulation environment based on a task target object of an industrial robot; generating additional training data of a task performance model of the industrial robot in the simulation environment; additionally training the task performance model based on the additional training data; and updating the task performance model.

In an embodiment, the constructing of the simulation environment based on the task target object of the industrial robot includes uploading data for the task target object to a cloud system, uploading environmental data associated with the task target object to the cloud system, and constructing the simulation environment based on the data for the task target object, and the environmental data.

In an embodiment, the data for the task target object may include point cloud data of the task target object.

In an embodiment, the task performance model may be a reinforced training model, and the additionally training of the task performance model based on the additional training data may include acquiring state information for reinforced training based on the simulation environment, determining a reward for an action of the industrial robot by using the state information based on the simulation environment, and performing the reinforced training of the task performance model based on the determined reward.

In an embodiment, the additionally training of the task performance model based on the additional training data may further include performing re-training of the task performance model when a performance of the additionally trained task performance model is less than a predetermined performance criterion.

In an embodiment, the constructing of the simulation environment based on the task target object of the industrial robot may include constructing the simulation environment in link with a monitoring operation for the task target object.

In an embodiment, the constructing of the simulation environment in link with the monitoring operation for the task target object may include identifying the task target object by using an object recognition model, and generating a monitoring result based on a result of identifying the task target object.

In an embodiment, the identifying of the task target object by using the object recognition model may include identifying the type of task target object, and determining the type of task of the industrial robot based on the type.

In an embodiment, the updating of the task performance model may include determining whether the task target object is an object predefined as an input of the industrial robot based on the monitoring result, updating the task performance model in the simulation environment based on the task target object when the task target object is an object which is not predefined as the input of the industrial robot, and maintaining the task performance model when the task target object is an object predefined as the input of the industrial robot.

In an embodiment, the method may further include performing user feedback based on the monitoring result.

In an embodiment, the user feedback may include whether the task target object exists, whether the task target object is the object not predefined as the input of the industrial robot, whether the task performance model is updated, and the task performance situation.

According to an embodiment of the present disclosure for implementing the object, disclosed is a computer program which allows operations for training a task performance model of an industrial robot. The operations may include an operation of constructing a simulation environment based on a task target object of an industrial robot; an operation of generating additional training data of a task performance model of the industrial robot in the simulation environment; an operation of additionally training the task performance model based on the additional training data; and an operation of updating the task performance model.

According to an embodiment of the present disclosure for implementing the object, disclosed is a computing device which allows operations for training a task performance model of an industrial robot. The computing device may include: at least one processor; and a memory, and at least one processor may be configured to construct a simulation environment based on a task target object of an industrial robot, generate additional training data of a task performance model of the industrial robot in the simulation environment, additionally train the task performance model based on the additional training data, and update the task performance model.

Advantageous Effects

The present disclosure can provide a method for training a task performance model of an industrial robot. For example, in the present disclosure, a simulation environment is constructed based on a task target object of the industrial robot to additionally train the task performance model of the industrial robot in the simulation environment.

MODE FOR INVENTION

Figure 1:
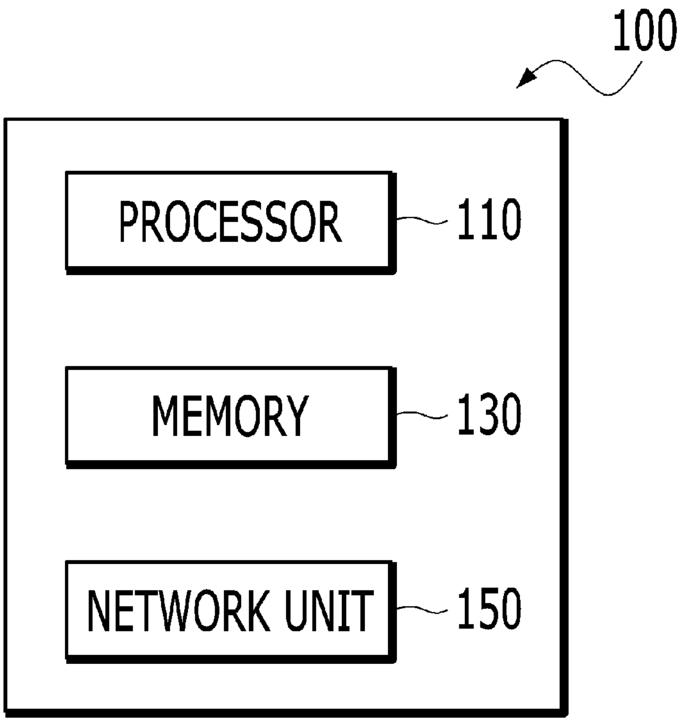
FIG. 1 is a block diagram of a computing device for training a task performance model of an industrial robot according to an embodiment of the present disclosure.

The present disclosure discloses a method for constructing a simulation environment based on a task target object, and additionally training a task performance model of the industrial robot in the simulation environment.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers.

Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally In terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a task performance model may be an artificial neural network model that performs, according to a type of task target object, a task corresponding to the type. Further, the task performance model may be a reinforced training model.

As a specific example of the task performance model, the task performance model is a model that allows an industrial robot to perform an operation of picking up an object by analyzing video data obtained by photographing the object with a camera such as CCTV when an object is set as a task target object.

As another example, the task performance model may be a model that analyzes data obtained by scanning a surrounding environment to determine a movement path and analyzes energy consumed when moving along the path to allow the industrial robot to perform an operation of moving along a specific movement path when the energy of the industrial robot is sufficient.

As yet another example, the task performance model may be a model that receives at least one of video data, audio data, and odor data as the task target object. In this case, the task performance model may be a model that transmits an alarm to a user when abnormality of the data is detected.

However, the task performance model of the present disclosure is not limited to the above example, and the task performance model may be appropriately designed to perform the task for more types of tasks.

FIG. 1 is a block diagram of a computing device for predicting cardiac arrest according to an embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for training the neural network.

At least one of the CPU, GPGPU, and TPU of the processor 110 may process training of a network function. For example, both the CPU and the GPGPU may process the training of the network function and data classification using the network function. Further, in an exemplary embodiment of the present disclosure, processors of a plurality of computing devices may be used together to process the training of the network function and the data classification using the network function. Further, the computer program executed in the computing device according to an exemplary embodiment of the present disclosure may be a CPU, GPGPU, or TPU executable program.

According to an embodiment of the present disclosure, the processor 110 may construct a simulation environment based on a task target object. At this time, the task target object may be an object, video data, audio data, odor data, or environmental data, but the present disclosure includes various types of task target objects in addition to the task target objects given as examples.

In order to construct the simulation environment, the processor 110 may perform appropriate preprocessing on the task target object according to the type of task target object. A specific method for the processor 110 to preprocess the task object will be described later with reference to FIGS. 6A, 6B, and 6C.

At this time, the simulation environment may refer to an environment in which virtual data is operated in which a task target model may be additionally trained without input data from an actual environment. A specific description of constructing the simulation environment will be described later with reference to FIG. 4.

The processor 110 may generate additional training data for the task performance model of the industrial robot in the simulation environment. A specific method for generating the additional training data will be described later with reference to FIG. 4.

In addition, when constructing the simulation environment, the processor 110 may construct the simulation environment in link with a monitoring operation for the task target object. A specific method for constructing the simulation environment in link with the monitoring operation will be described later with reference to FIG. 5.

The processor 110 may generate a monitoring result through the monitoring operation. Thereafter, the processor 110 may perform user feedback based on the monitoring result. At this time, the user feedback may include whether the task target object exists, whether the task target object is an object that is not predefined as an input of the industrial robot, whether the task performance model is updated, and a task performance situation.

The processor 110 may additionally train the task performance model of the industrial robot based on the generated additional training data. In the process of additionally training the task performance model of the industrial robot by the processor 110, performance verification and re-training of the model may be performed. Specifically, when the performance of the additionally trained task performance model is less than a predetermined performance criterion, the processor 110 may further train the model by further generating the additional training data without updating the model.

In the present disclosure, depending on whether the task target object is an object predefined as the input of the industrial robot through the monitoring operation, the task performance model of the industrial robot is further trained in the simulation environment or an original model is continuously used. When the task performance model is additionally trained using the additional training data in the simulation environment, the task performance model may be additionally trained based on the additional training data generated in the simulation environment, thereby increasing the performance of the model. As a result, the performance of industrial robots may be enhanced due to the present disclosure.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network unit 150 presented in the present disclosure may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

In this disclosure, the network unit 150 can use a wireless communication system of any form.

The techniques described in the present disclosure may also be used in other networks mentioned above.

Figure 2:
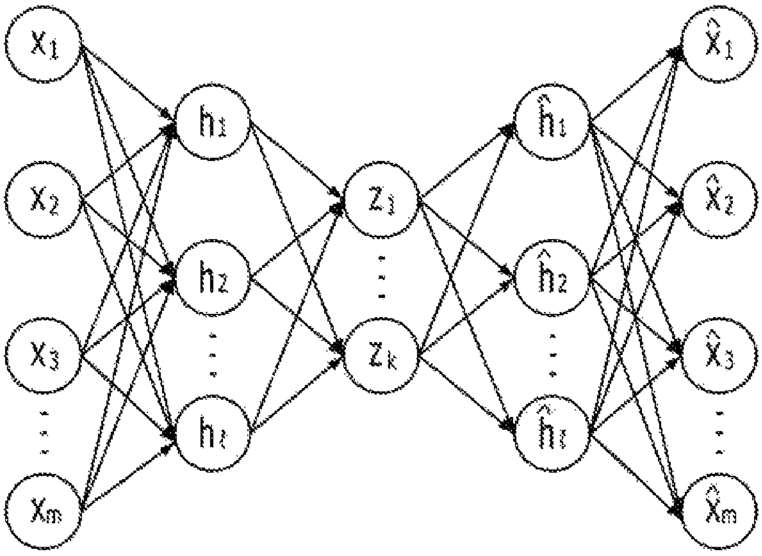
FIG. 2 is a schematic view illustrating a network function according to an embodiment of the present disclosure.

FIG. 2 is a conceptual view illustrating a neural network according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be trained in at least one scheme of supervised learning, unsupervised learning, semi supervised learning, or reinforcement learning. The learning of the neural network may be a process in which the neural network applies knowledge for performing a specific operation to the neural network.

The neural network may be trained in a direction to minimize errors of an output. The training of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a training cycle (epoch). The learning rate may be applied differently according to the number of repetition times of the training cycle of the neural network. For example, in an initial stage of the training of the neural network, the neural network ensures a certain level of performance quickly by using a high learning rate, thereby increasing efficiency and uses a low learning rate in a latter stage of the training, thereby increasing accuracy.

In training of the neural network, the training data may be generally a subset of actual data (i.e., data to be processed using the trained neural network), and as a result, there may be a training cycle in which errors for the training data decrease, but the errors for the actual data increase. Overfitting is a phenomenon in which the errors for the actual data increase due to excessive training of the training data. For example, a phenomenon in which the neural network that trains a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of training, utilization of a batch normalization layer, etc., may be applied.

Figure 3:
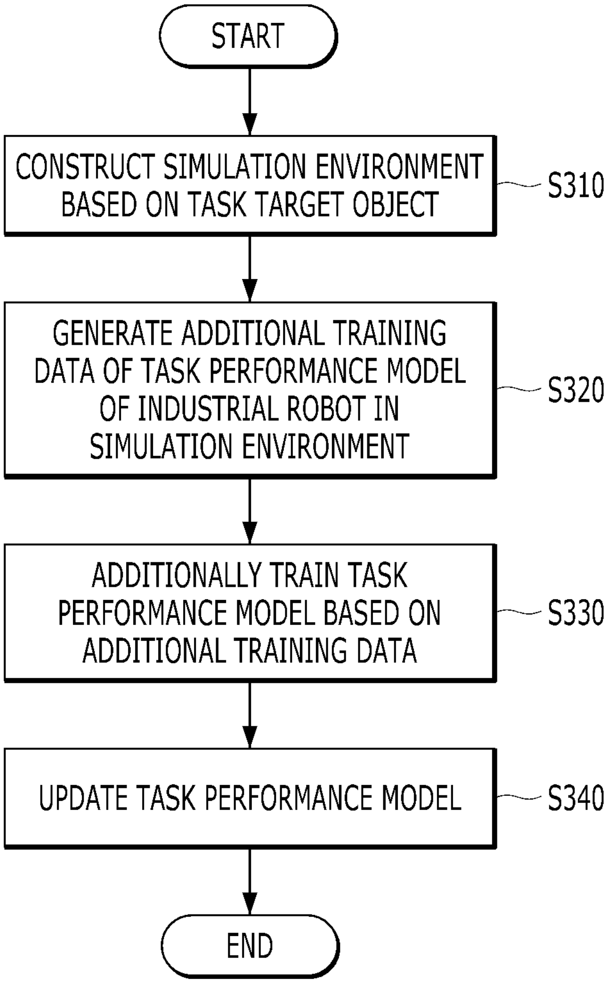
FIG. 3 is a flowchart illustrating a process of training a task performance model of an industrial robot according to an embodiment of the present disclosure.

FIG. 3 is a flowchart illustrating a process of training a task performance model of an industrial robot according to an embodiment of the present disclosure.

According to the present disclosure, the process of training the task performance model of the industrial robot may include step S310 of constructing a simulation environment based on a task target object, step S320 of generating additional training data of a task performance model of an industrial robot in the simulation environment, step S330 of additionally training the task performance model based on the additional training data, and step S340 of updating the task performance model.

In step S310, the processor may construct the simulation environment based on the task target object. A specific method for constructing the simulation environment will be described later with reference to FIG. 4.

In step S320, the processor 110 may generate the additional training data of the task performance model of the industrial robot in the simulation environment. In step S310, the simulation environment is constructed to simulate an actual environment and an actual task target object in which the industrial robot is placed, so the simulation environment may generate virtual training data for additionally training the task performance model.

In step S330, the processor 110 may additionally train the task performance model based on the additional training data. When the task performance model is a reinforced training model, the processor 110 may acquire current state information of the task performance model based on the simulation environment. The task performance model may perform an action for given additional training data, and the processor 110 may determine a reward for the action by using state information based on the simulation environment. In addition, based on the determined reward, the task performance model which is the reinforced training model may be additionally trained.

In step S340, the processor 110 may update the additionally trained task performance model based on the additional training data. An update method of the task performance model may be made by a scheme of replacing a current task performance model of the industrial robot with the additionally trained task performance model. Since the replaced task performance model is the model additionally trained in the simulation environment, the industrial robot may be operated based on the additionally trained task performance model when the task performance model is updated. As a result, the additionally trained task performance model is updated, so the performance of the industrial robot may be enhanced.

Figure 4:
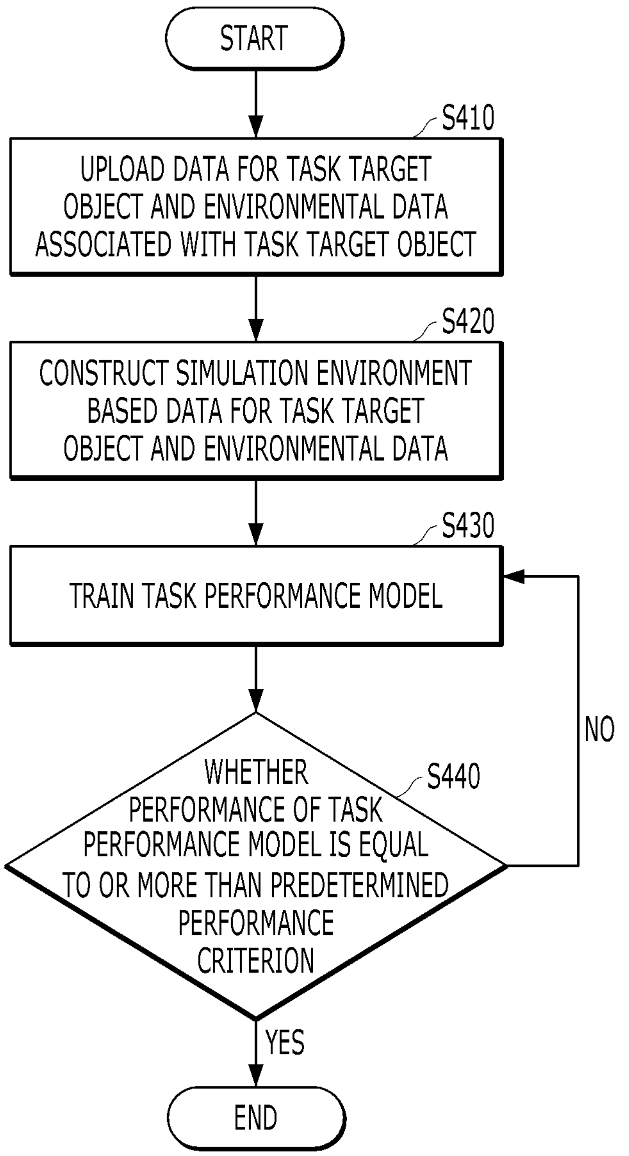
FIG. 4 is a flowchart illustrating a process of constructing a simulation environment based on a task target object of an industrial robot, and train a task performance model of the industrial robot according to an embodiment of the present disclosure.

FIG. 4 is a flowchart illustrating a process of constructing a simulation environment based on a task target object of an industrial robot, and train a task performance model of the industrial robot according to an embodiment of the present disclosure.

According to FIG. 4, the process of constructing the simulation environment based on the task target object of the industrial robot and training the task performance model may include step S410 of uploading data for the task target object and environmental data associated with the task target object, step S420 of constructing the simulation environment based on the data for the task target object and the environmental data, step S430 of training the task performance model, and step S440 of determining whether a performance of the task performance model is equal to or more than a predetermined performance criterion.

In step S410, the processor 110 may upload data for the task target object and environmental data associated with the task target object in order to construct the simulation environment.

Specifically, the processor 110 may upload the data for the task target object to a cloud system in order to construct the simulation environment. In this case, when the task target object is a 3D object, the data for the task target object may include point cloud data of the task target object.

In addition, the processor 110 may also upload the environmental data associated with the task target object to the same cloud system. For example, the environmental data may include information on a space in which the task target object is placed.

In step S420, the processor 110 simulates an actual environment in which the industrial robot is placed and a task target object which is an actual input based on the data for the task target object and the environmental data uploaded to the cloud system to construct the simulation environment so as to train the model in a virtual data space.

In step S430, the processor 110 may perform additional training of the task performance model based on the constructed simulation environment. The task performance model may include various types of artificial neural network models, and an additional training method of the task performance model may be a method such as supervised learning, unsupervised learning, reinforced learning, etc., which matches the type of task performance model. When the task performance model is the reinforced training model, the method for additionally training the task performance model is described above with reference to FIG. 3.

In step S440, the processor 110 may determine whether the performance of the additionally trained task performance model is equal to or more than a predetermined performance criterion. When it is determined that the performance of the additionally trained task performance model is equal to or more than the predetermined performance criterion, the task performance model of the industrial robot may be updated. The specific method for updating the task performance model of the industrial robot is described above with reference to FIG. 3. When the performance of the task performance model does not satisfy a predetermined performance criterion, the processor 110 may generate the additionally training data based on the simulation environment, and perform additional training for the task performance model based on the additional training data.

As described above, when the task performance model is additionally trained in the simulation environment as in the present disclosure, an effect of being able to perform the additional training for the task performance model without stopping the operation of the task performance model is generated. In addition, since additional data generated in a simulation environment may be generated at a much lower cost than the additional training data generated in the actual environment, an effect is also generated in which the cost required for the additional training of the task performance model is significantly reduced.

Figure 5:
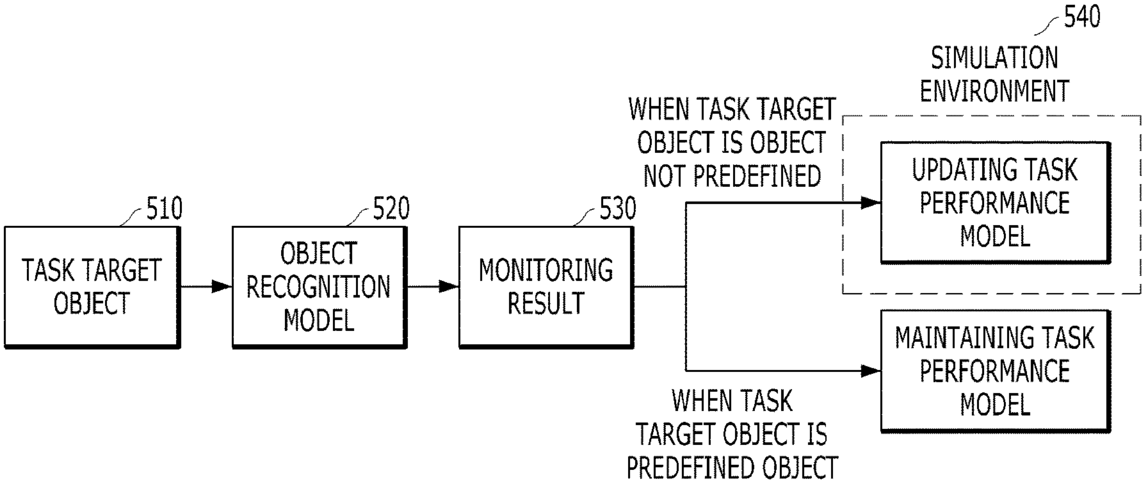
FIG. 5 is a conceptual view illustrating a process of selecting whether to update the task performance model of the industrial robot depending on the task target object according to an embodiment of the present disclosure.

FIG. 5 is a conceptual view illustrating a process of selecting whether to update the task performance model of the industrial robot depending on the task target object according to an embodiment of the present disclosure.

An object recognition model 520 may be an artificial neural network model that determines a type of input object and a task type of the industrial robot. The object recognition model 520 may receive a task target object 510 as an input, and generate a monitoring result 530.

The monitoring result 530 may include whether the task target object input into the object recognition model is an object which is not predefined. In this case, the processor 110 may construct the simulation environment 540, and update the task performance model when the task target object is the object which is not predefined as the input of the task performance model by referring to the monitoring result. The specific method for constructing the simulation environment and updating the task performance model is described above with reference to FIG. 4.

The processor 110 may maintain the model without performing the additional training for the task performance model of the industrial robot when the task target object is the predefined object as the input of the task performance model by referring to the monitoring result. When the task target object is the predefined object as the input of the task performance model, there is a high possibility that the task performance model will also be trained already sufficiently for the corresponding object. Therefore, when the additional training is performed for the predefined object based on the simulation environment, the performance improvement of the task performance model may be minimal or non-existent compared to the time and cost required for the additional training. Therefore, in this case, an entire training process may be operated efficiently in terms of cost and time by maintaining an original task performance model.

As a result, as in the present disclosure, the processor 110 determines whether to additionally train each task performance model based on the monitoring result 530, thereby reducing the cost and time required for retraining the model.

Figure 6A:
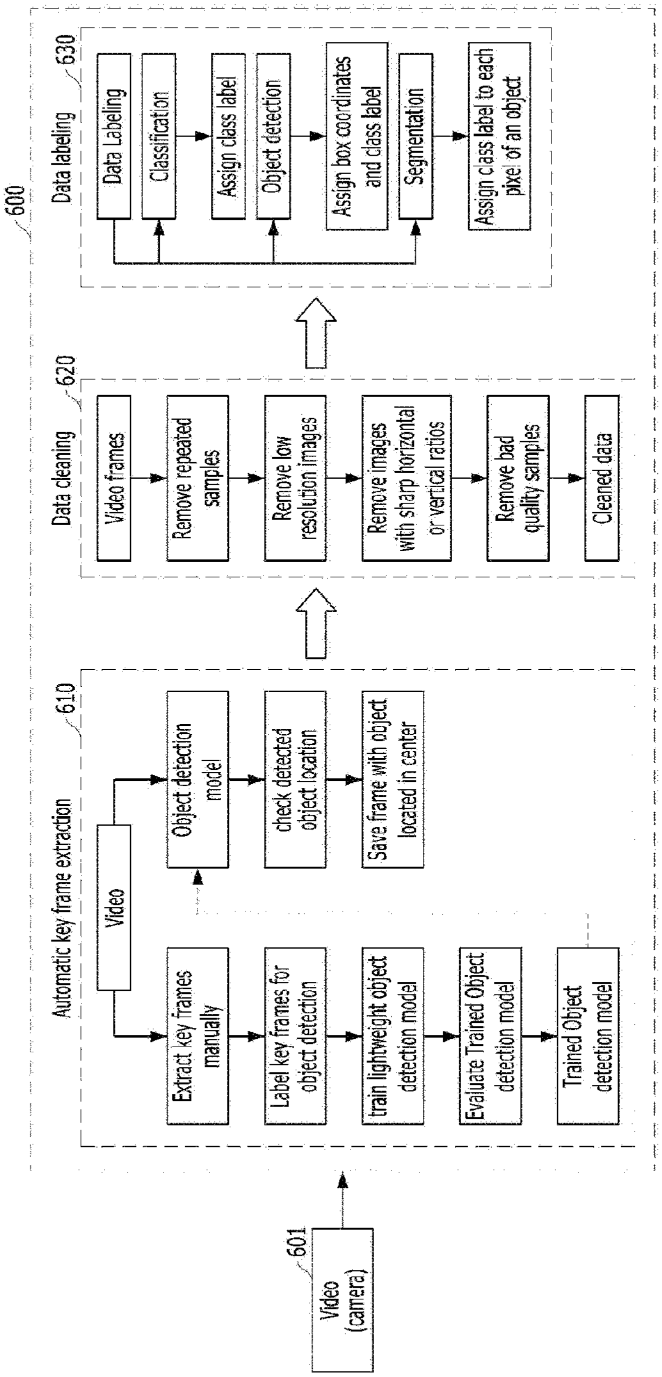
FIG. 6A is a conceptual view illustrating a process of preprocessing video data according to an embodiment of the present disclosure.

FIG. 6A is a conceptual view illustrating a process of preprocessing video data according to an embodiment of the present disclosure.

The processor 110 may preprocess input video data 601 through a preprocessing model 600. For example, the processor 110 may extract key frames from the video data 601 based on a process 610 of extracting the key frames. The key frame may be a frame in which all objects included in a video are determined to be at a center. Specifically, first, the processor 110 may extract the object by analyzing the video data 601 based on an object recognition model and analyze a location of the object. Thereafter, the processor 110 may select a frame with the object at the center among frames constituting the video data 601 based on a key frame extraction model (not illustrated) and determine the frame as a key frame.

In this case, the key frame extraction model may be an artificial neural network model. In order to train the key frame extraction model, training key frames may be manually extracted from training video data. Thereafter, each object in the extracted key frames may be labeled with bounding box coordinates and a class label for the object. The key frame extraction model may be trained through the labeled training video data to detect the location and class of objects as described above.

The processor 110 may perform a data cleaning process 620 for the key frames extracted from the video data 601. The processor 110 may remove the same images with respect to the extracted key frames. Further, the processor 110 may remove low-resolution images from the key frames. Further, the processor 110 may remove images with sharp horizontal or vertical ratios from the key frames. However, the data cleaning method for the key frames of the present disclosure is not limited to the above example, and the processor 110 may determine and remove an image with a low quality among the key frames through a method not included in the above example among the key frames.

The processor 110 may undergo a data labeling process 630 for using the key frames that undergo the data cleaning process as training data. Data, that is, the key frames which undergo the data cleaning process may be classified according to a feature of an object included in each key frame. Thereafter, classes of the key frames may be defined. Further, a bounding box for each object may be generated based on detection of the object included in the key frame. Further, the class may be defined for each object included in the key frame.

Figure 6B:
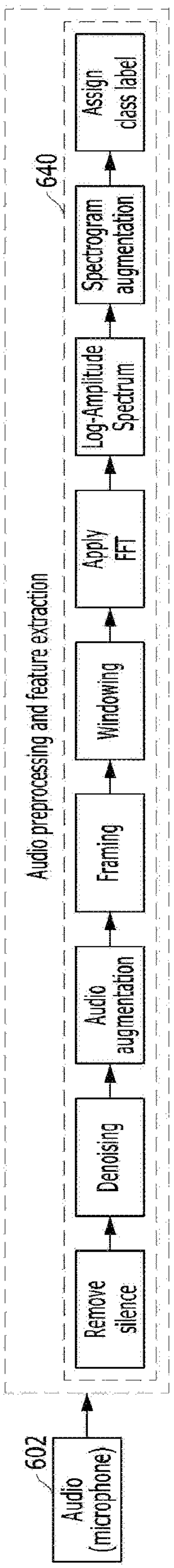
FIG. 6B is a conceptual view illustrating a process of preprocessing audio data according to an embodiment of the present disclosure.

FIG. 6B is a conceptual view illustrating a process of preprocessing audio data according to an embodiment of the present disclosure.

The processor 110 may preprocess audio data 602 through the preprocessing model 600. Specifically, the processor 110 may remove a silent portion of the audio data. Thereafter, the processor 110 may remove noise of the audio data from which the silent portion is removed. Thereafter, the processor 110 may increase the number of audio data using audio augmentation methods, such as pitch shifting and time-scale modification. Thereafter, the processor 110 may divide the entire audio data into small parts, frame the small parts, and perform frame smoothing for each frame through a window function. Thereafter, the processor 110 may extract a frequency feature of the window frame of the audio data based on a Fast Fourier Transform (FFT) algorithm. Thereafter, the processor 110 applies a log scale to the extracted frequency feature to generate a log-amplitude spectrum for the audio data, and then applies a time and frequency shifting algorithm to the generated spectrogram to increase the spectrogram. Thereafter, the processor 110 may generate a class label for the spectrogram generated from each audio data.

Figure 6C:
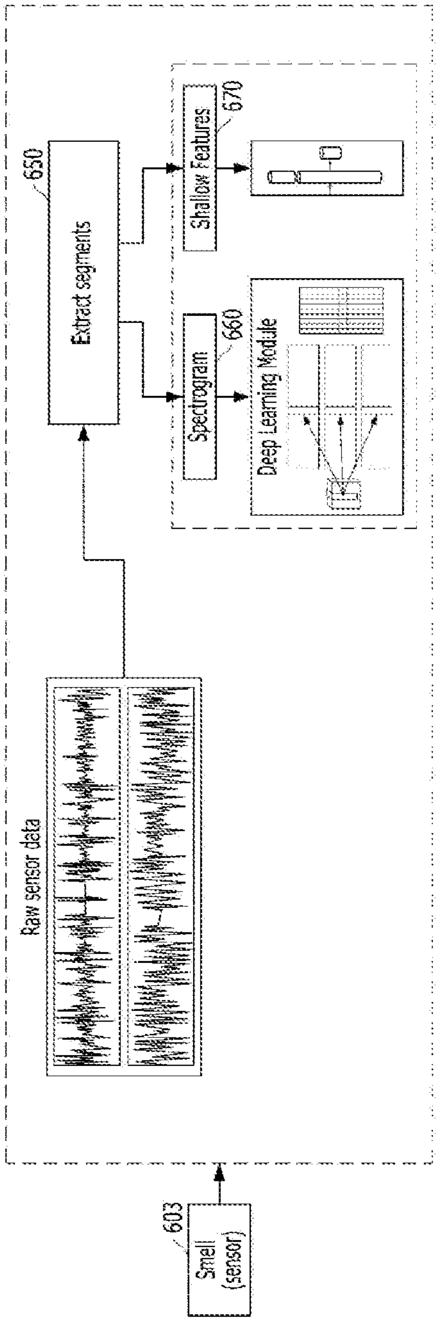
FIG. 6C is a conceptual view illustrating a process of preprocessing odor data according to an embodiment of the present disclosure.

FIG. 6C is a conceptual view illustrating a process of preprocessing odor data according to an embodiment of the present disclosure.

The processor 110 may preprocess odor data 603 through the preprocessing model 600. Specifically, the processor 110 may divide the odor data 603 into frames based on the preprocessing model 600. Thereafter, the processor 110 extracts a feature for an odor data frame based on the fast Fourier transform (FFT) algorithm for each frame to generate the spectrogram. The processor 110 may generate a feature map for the spectrogram for each frame, and extract shallow features.

Disclosed is a computer readable medium storing the data structure according to an exemplary embodiment of the present disclosure.

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an availability designed data structure, a computing device can perform operations while using the resources of the computing device to a minimum. Specifically, the computing device can increase the efficiency of operation, read, insert, delete, compare, exchange, and search through the availability designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

In the present disclosure, a network function, an artificial neural network, and a neural network may be used to be exchangeable. From here on, it will be described uniformly using neural networks. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for training the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for training the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include training data input in a neural network training process and/or input data input to a neural network in which training is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network training process and/or a weight in which neural network training is completed. The weight which varies in the neural network training process may include a weight at a time when a training cycle starts and/or a weight that varies during the training cycle. The weight in which the neural network training is completed may include a weight in which the training cycle is completed. Accordingly, the data structure including the weight of the neural network may include a data structure including the weight which varies in the neural network training process and/or the weight in which neural network training is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of training cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 7:
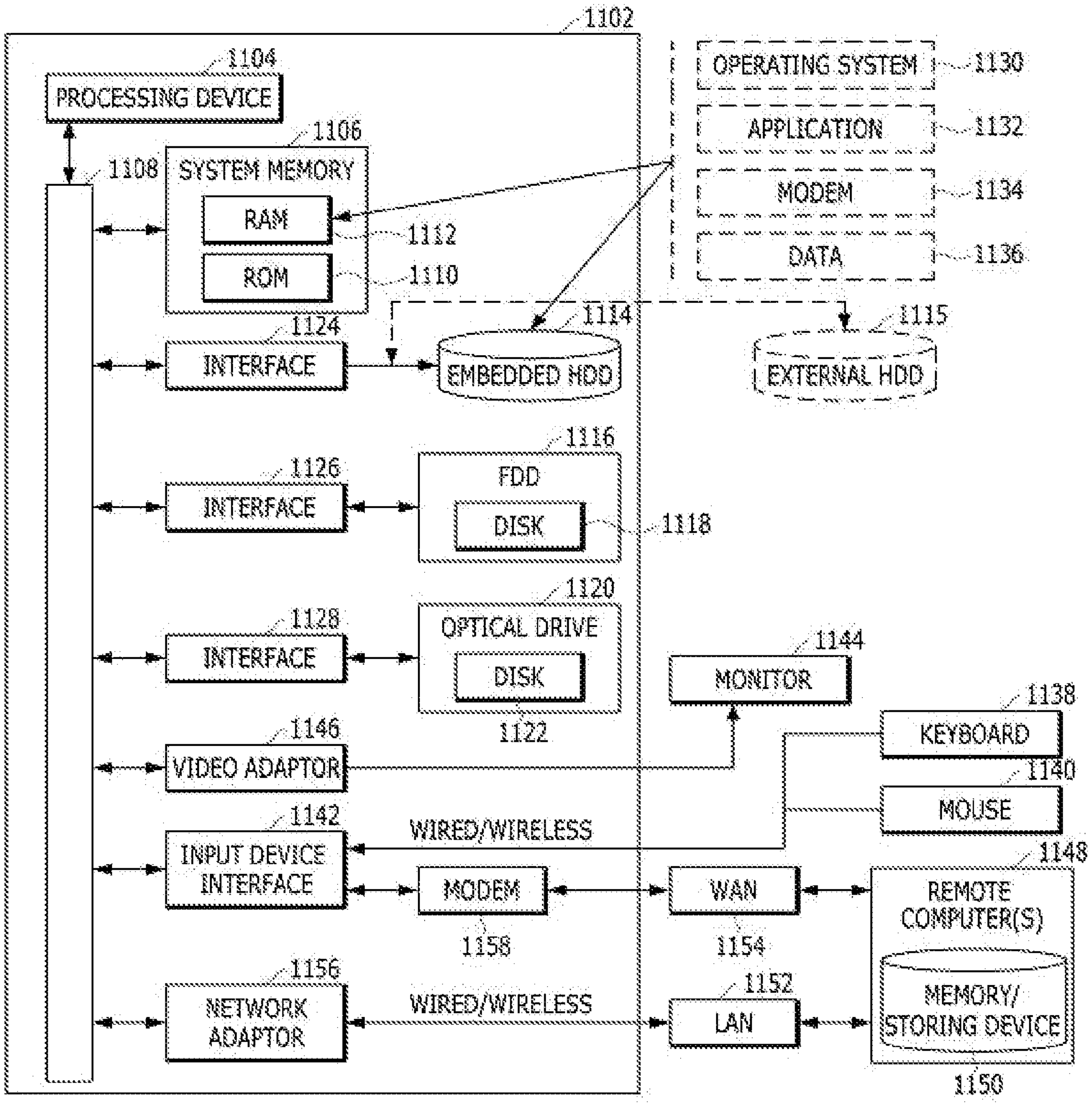
FIG. 7 is a simple and normal schematic view of an exemplary computing environment in which the embodiments of the present disclosure may be implemented.

FIG. 7 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

The invention claimed is:

1. A method for training a task performance model of an industrial robot, the method performed by a computing device, the method comprising:

constructing a simulation environment based on a task target object of the industrial robot;

generating additional training data of the task performance model of the industrial robot in the simulation environment;

additionally training the task performance model based on the additional training data without stopping the operation of the task performance model; and updating the task performance model without stopping the operation of the task performance model.

2. The method of claim 1, wherein the constructing of the simulation environment based on the task target object of the industrial robot includes:

uploading data for the task target object to a cloud system;

uploading environmental data associated with the task target object to the cloud system; and constructing the simulation environment based on the data for the task target object, and the environmental data.

3. The method of claim 2, wherein the data for the task target object includes:

point cloud data of the task target object.

4. The method of claim 1, wherein the task performance model includes a reinforced learning model, and wherein the additionally training of the task performance model based on the additional training data includes:

acquiring state information for reinforced learning based on the simulation environment;

determining a reward for an action of the industrial robot by using the state information based on the simulation environment; and performing the reinforced learning of the task performance model based on the determined reward.

5. The method of claim 1, wherein the additionally training of the task performance model based on the additional training data further includes:

performing re-training of the task performance model when a performance of the additionally trained task performance model is less than a predetermined performance criterion.

6. The method of claim 1, wherein the constructing of the simulation environment based on the task target object of the industrial robot includes:

constructing the simulation environment in link with a monitoring operation for the task target object.

7. The method of claim 6, wherein the constructing of the simulation environment in link with the monitoring operation for the task target object includes:

identifying the task target object by using an object recognition model; and generating a monitoring result based on a result of identifying the task target object.

8. The method of claim 7, wherein the identifying of the task target object by using the object recognition model includes:

identifying a type of the task target object; and determining a type of task of the industrial robot based on the type.

9. The method of claim 7, wherein the updating of the task performance model includes:

determining whether the task target object is an object predefined as an input of the industrial robot based on the monitoring result;

updating the task performance model in the simulation environment based on the task target object when the task target object is an object not predefined as an input of the industrial robot; and maintaining the task performance model when the task target object is an object predefined as an input of the industrial robot.

10. The method of claim 7, further comprising:

performing user feedback based on the monitoring result.

11. The method of claim 10, wherein the user feedback includes:

whether the task target object exists;

whether the task target object is an object not predefined as an input of the industrial robot;

whether to update the task performance model, and a task performance situation.

12. A computer program stored in a non-transitory computer readable storage medium, the computer program including instructions which allow a computing device to perform operations, the operations comprising:

an operation of constructing a simulation environment based on a task target object of an industrial robot;

an operation of generating additional training data of a task performance model of the industrial robot in the simulation environment;

an operation of additionally training the task performance model based on the additional training data without stopping the operation of the task performance model; and an operation of updating the task performance model without stopping the operation of the task performance model.

13. A computing device comprising:

at least one processor; and a memory, wherein the at least one processor is configured to:

construct a simulation environment based on a task target object of an industrial robot;

generate additional training data of a task performance model of the industrial robot in the simulation environment;

additionally train the task performance model based on the additional training data without stopping the operation of the task performance model; and update the task performance model without stopping the operation of the task performance model.

* * * * *